United States Patent [19]
Saito et al.

[11] B 3,999,028
[45] Dec. 21, 1976

[54] METHOD AND APPARATUS FOR ELECTRICAL DISCHARGE MACHINING

[75] Inventors: Nagao Saito, Nagoya; Kazuhiko Kobayashi, Seto; Toshiro Oizumi, Nagoya, all of Japan

[73] Assignee: Mitsubishi Denki Kabushiki Kaisha, Tokyo, Japan

[22] Filed: Dec. 19, 1973

[21] Appl. No.: 426,227

[44] Published under the second Trial Voluntary Protest Program on March 2, 1976 as document No. B 426,227.

[30] Foreign Application Priority Data

Dec. 19, 1972 Japan .................... 47-127498

[52] U.S. Cl. .................... 219/69 M; 219/69 C; 219/69 P
[51] Int. Cl.² .................... B23P 1/08
[58] Field of Search ............ 219/69 C, 69 P, 69 M; 331/144; 315/224, 225, 332; 321/27 R; 307/24, 29, 31, 35, 82

[56] References Cited
UNITED STATES PATENTS

| | | | |
|---|---|---|---|
| 3,590,317 | 6/1971 | Sennowitz | 219/69 C |
| 3,614,368 | 10/1971 | Lobur | 219/69 C |
| 3,697,719 | 10/1972 | Vernen | 219/69 C |
| 3,705,287 | 12/1972 | Saito et al. | 219/69 P |
| 3,755,645 | 8/1973 | Kauffman | 219/69 C |

*Primary Examiner*—Bruce A. Reynolds
*Attorney, Agent, or Firm*—Oblon, Fisher, Spivak, McClelland & Maier

[57] ABSTRACT

A method and apparatus for shaping a workpiece by electrical discharge, the workpiece being shaped by a shaping electrode by intermittently impressing a voltage pulse across a working gap formed between the workpiece and the shaping electrode. The apparatus comprises a means for efficiently controlling the duration of a discharge across the working gap according to a condition dependent upon a no-load voltage impressing period, i.e., the period of operation beginning with the impression of the voltage pulse and ending with the occurrence of a discharge, and further according to the state of the working gap detected in terms of a processing voltage mean value. When a no-load voltage impressing period is inside a given interval, the duration of a discharge is increased according to the length of the period. Alternatively, when the no-load voltage impressing period is outside the given interval, the duration of a discharge corresponding to the state of the working gap is not increased. Accordingly, operating stability is improved and electrode consumption is minimized.

5 Claims, 8 Drawing Figures

METHOD AND APPARATUS FOR ELECTRICAL DISCHARGE MACHINING

BACKGROUND OF THE INVENTION

1. Field of the Invention

The present invention generally relates to a method and apparatus for shaping a workpiece with a shaping electrode by intermittently impressing a pulse to generate a spark across a working gap formed between the workpiece and the electrode, and more particularly to a method and apparatus for shaping a workpiece wherein the width of the voltage pulse is controlled according to the state of the working gap.

2. Description of the Prior Art

In the past, in processes for shaping a workpiece by electrical discharge, the state of the working gap was naturally variable, and often resulted in an unusual spark across the gap and thereby damaged the workpiece and electrode if the electrical condition, such as the mean value of the discharge current, was left uncontrolled. The operator therefore had to adjust the electrical condition as the state of the working gap changed. To this end, the operator had to have a considerable amount of experience and skill in finding an optimum electrical condition. FIGS. 1 to 4 describe an electrical discharge apparatus of the prior art.

FIG. 1 schematically illustrates an electrical discharge shaping electrode 1 positioned adjacent a workpiece 2 through a working gap. The electrode 1 and the workpiece 2 could be immersed in an insulating fluid such as kerosene. The references 3A, 3B, . . ., 3N denote a plurality of transistors, connected in parallel to each other, which generate square-wave voltage pulses to spark an intermittent current across the working gap. The number of transistors used depends upon the amount of discharge current required. Hence, for example, one transistor will suffice when the discharge current required is low. The references 4A, 4B, . . ., 4N indicate resistors for controlling and balancing the currents flowing through the collectors of the transistors. Resistors 5A to 5N are base resistors for controlling the currents flowing through the bases of the transistors, and a timer 6 comprises a pulse generating circuit including such elements as an astable multivibrator, a monostable multivibrator and a flip-flop circuit. An amplifier 7 amplifies pulses generated in the timer 6 and supplies an output to the transistors 3A, 3B, . . ., 3N. The numeral 8 designates a DC power source.

FIGS. 2 and 3 show voltage and current waveforms appearing across the working gap of the apparatus in FIG. 1. The waveforms in FIG. 2 appear when the pulse width and a quiescent period are controlled, and those in FIG. 3 appear when the duration of discharge is controlled by increasing the pulse width as a function of the period during which the no-load voltage is present across the working gap. In FIGS. 2 and 3, the numeral 9 denotes a pulse width, 10 a quiescent period, 11 a period during which the no-load voltage is impressed, 12 a duration of discharge, 13 a no-load voltage, 14 a discharge voltage, 15 a discharge current, 16 a peak discharge current, and 17 a mean processing current. Under stable processing conditions, the no-load voltage 13 appears with a high probability, and its mean period 11 is controlled to be constant by a servo mechanism capable of maintaining constant the means processing voltage across the working gap. This control, however, is stable only when the state of the working gap is good. In other words, if the state of the working gap has deteriorated due to, for example, a deposit of chips between the working gap, the no-load voltage impressing period diminishes or even vanishes as shown in FIG. 4(a) relative to FIGS. 2 and 3. As a result, it is very likely that the discharge will be concentrated at a specific point, and thus will produce a hollow portion on the workpiece.

In such an event a current waveform as shown in FIG. 4(b) appears, the duration of a discharge becomes larger than those shown in FIGS. 2(b) and 3(b), and the mean current increases accordingly. If this condition continues for a certain period of time, an extinction of ions across the working gap does not properly occur, the discharge is concentrated at one point on the workpiece and the state of the working gap is further impaired. To solve this problem, the state of the working gap must be restored by decreasing the mean current.

One prior art method of decreasing the mean current was to detect the state of the working gap in terms of discharge current mean value, and to change the oscillation frequency according to the detected value. While somewhat satisfactory, this method, however, was not practical because the oscillation frequency could not be changed fast enough in response to the quickly varying state of the working gap. Accordingly, this method was not a very effective method for decreasing the mean current.

SUMMARY OF THE INVENTION

Accordingly, an object of the present invention is to provide a new, improved and unique method and apparatus for shaping a workpiece by electrical discharge, the workpiece being shaped dependent on a voltage pulse intermittently applied across a working gap formed between the workpiece and the shaping electrode wherein the duration during which a discharge is sustained is controlled according to the period of operation beginning with the impression of a pulse voltage and ending with the occurrence of a discharge therebetween and also according to the state of the working gap.

Another object of the present invention is to provide a new, improved and unique method and apparatus for shaping a workpiece by electrical discharge wherein, when the period of operation beginning with the impression of a voltage pulse and ending with the occurrence of a discharge is inside a given interval, the duration of discharge is increased, while, when the period of operation is outside the given interval, the duration of discharge corresponding to the state of the working gap is not increased. Accordingly a stable processing is maintained and electrode consumption is minimized.

Briefly, these and other objects, and features of this invention are in one aspect attained by providing an apparatus which consists essentially of switching elements for controlling a voltage pulse impressed across a working gap formed between a workpiece and an electrode, and a control device which comprises a device for measuring the period during which the no-load voltage is impressed, i.e., the period of operation beginning with the impression of a pulse voltage and ending with the occurrence of a discharge; a device for detecting the state of the working gap; a device for controlling the duration of discharge according to the output signal from the no-load voltage period measuring device and the output signal from the working gap state detecting device; and a device for controlling the quiescent interval between the voltage pulses. This apparatus is capable of operation wherein the on-off time of the switching element is controlled through the output of the control device, thereby controlling the duration of discharge. Accordingly, a voltage pulse is intermittently impressed across the working gap, and thus a stable shaping operation is realized.

These and other objects, features and advantages of the invention will become more apparent from the detailed specification taken in conjunction with the accompanying drawings wherein:

DESCRIPTION OF THE PREFERRED EMBODIMENT

Figure 5:
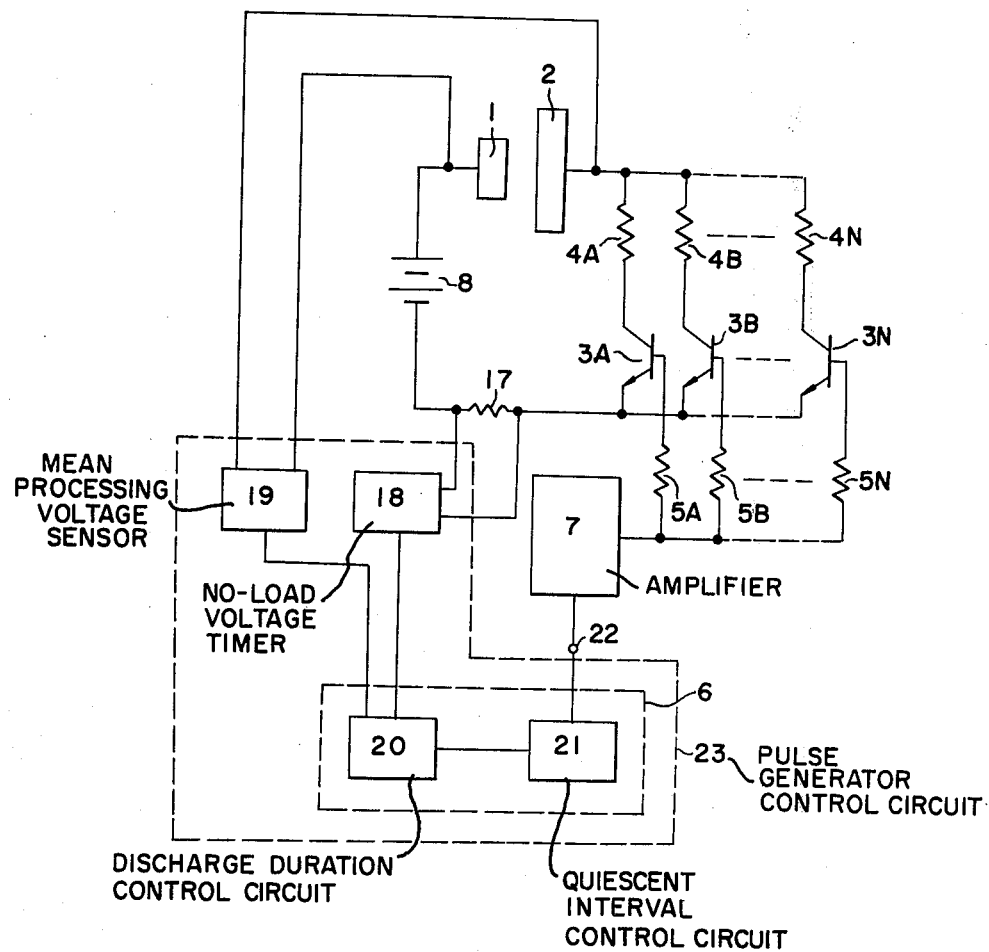
FIG. 5 is an electrical circuit diagram showing an apparatus embodying the present invention.

Referring now to the drawings, wherein like reference numerals generally designate identical or corresponding parts throughout the several views, and more particularly to FIGS. 5 and 6 thereof, an embodiment of the invention will be described. In FIG. 5, the reference numeral 17 denotes a shunt resistor, 18 a circuit for measuring the period during which a no-load voltage is impressed, i.e., the period of operation beginning with the impression of a voltage across the working gap and ending with the occurrence of a discharge detected through a voltage drop across the resistor 17, and 19 a circuit for detecting the state of the working gap in terms of processing voltage mean value.

Figure 1:
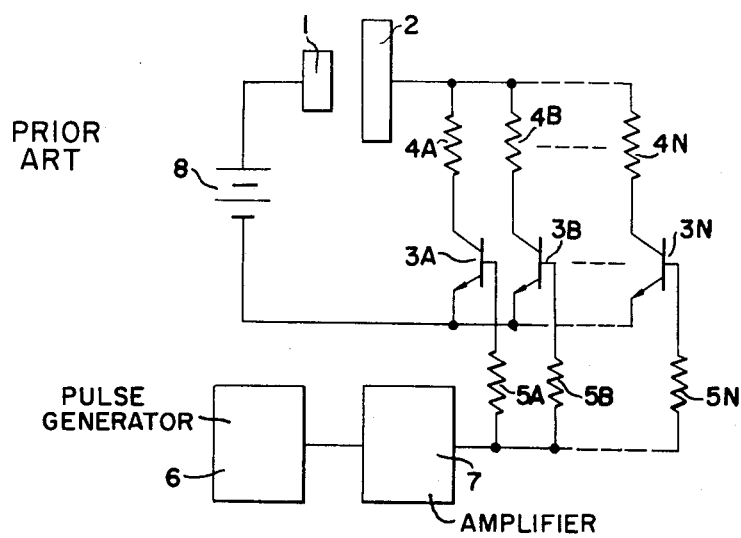
FIG. 1 is a electrical circuit diagram showing a conventional apparatus.
Figure 2:
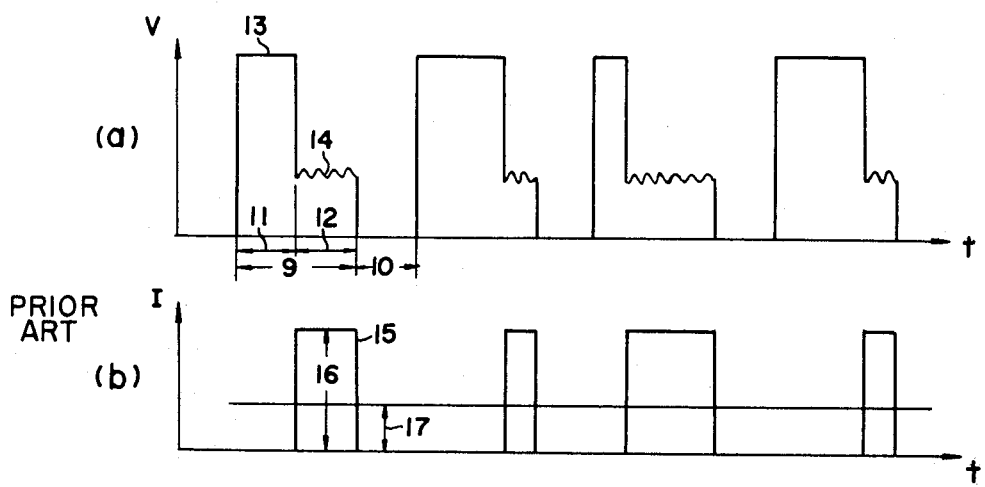
FIGS. 2 through 4 are diagrams showing voltage and current waveforms appearing across a working gap in the apparatus of FIG. 1.
Figure 3:
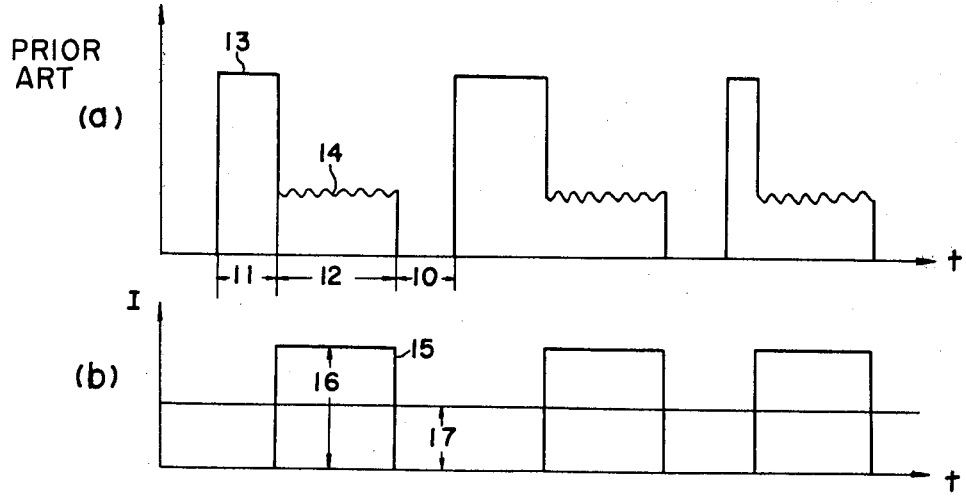
Figure 4:
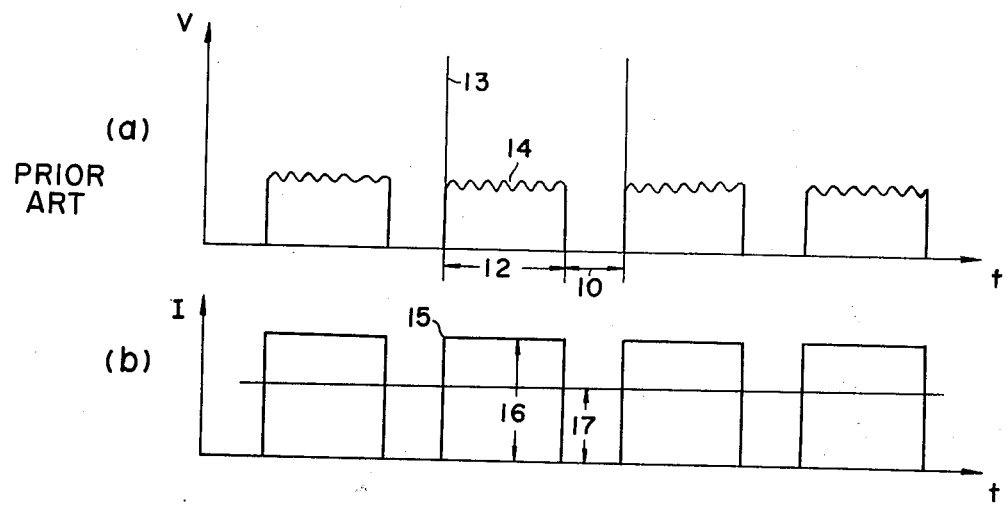

The reference numeral 20 is a circuit for controlling the duration during which a discharge is sustained, according to the output signals from the circuits 18 and 19, and 21 is a circuit for controlling the pulse quiescent interval which, together with the circuit 20, constitutes a timer circuit 6. The timer circuit 6, in combination with circuits 18 and 19, constitutes a control section 23. Other circuits are similar to those shown in FIG. 1 and hence further description thereof is not given herein. This apparatus operates on the following principle.

A group of transistors 3A, 3B, . . ., 3N are turned on by a signal from an amplifier 7, to cause a voltage to be impressed across the working gap. A certain time after this operation, a discharge takes place, a current begins to flow through the resistor 17, and the circuit 18 detects the voltage drop across the resistor 17, i.e., the instant the discharge began, and thus measures the period during which a no-load voltage is impressed. At the same time the state of the working gap is detected in terms of an electric signal by the circuit 19. This signal may be a mean processing voltage across the working gap, or a variable component of the processing voltage, or the like. If processing becomes unstable, this will cause trouble such as a short-circuit resulting in a considerably lower mean processing voltage or a marked variation in the processing voltage. Hence, through such an electrical signal, the state of the working gap can be determined.

In this stage, the period of discharge duration is controlled by the circuit 20 according to the output signals from the circuits 18 and 19. A certain time interval after this operation, a group of transistors 3A, 3B, . . ., 3N are turned off. The period during which these transistors are kept non conducting is determined by the quiescent period measuring circuit 21. The signal from this circuit 21 is supplied to the amplifier 7 by way of a terminal 22.

In this manner the period during which a discharge is sustained is controlled dependent upon the no-load voltage period incidentai to the presence of each pulse and upon the state of the working gap detected in terms of processing voltage mean value. When a discharge occurs simultaneously with the impression of a voltage, without any no-load voltage present, the duration of discharge is minimum and accordingly the mean processing current is also minimum. If necessary, the duration of discharge may be controlled to not exceed a certain maximum length but to be constant by controlling the period for which a no-load voltage is impressed.

Figure 6:
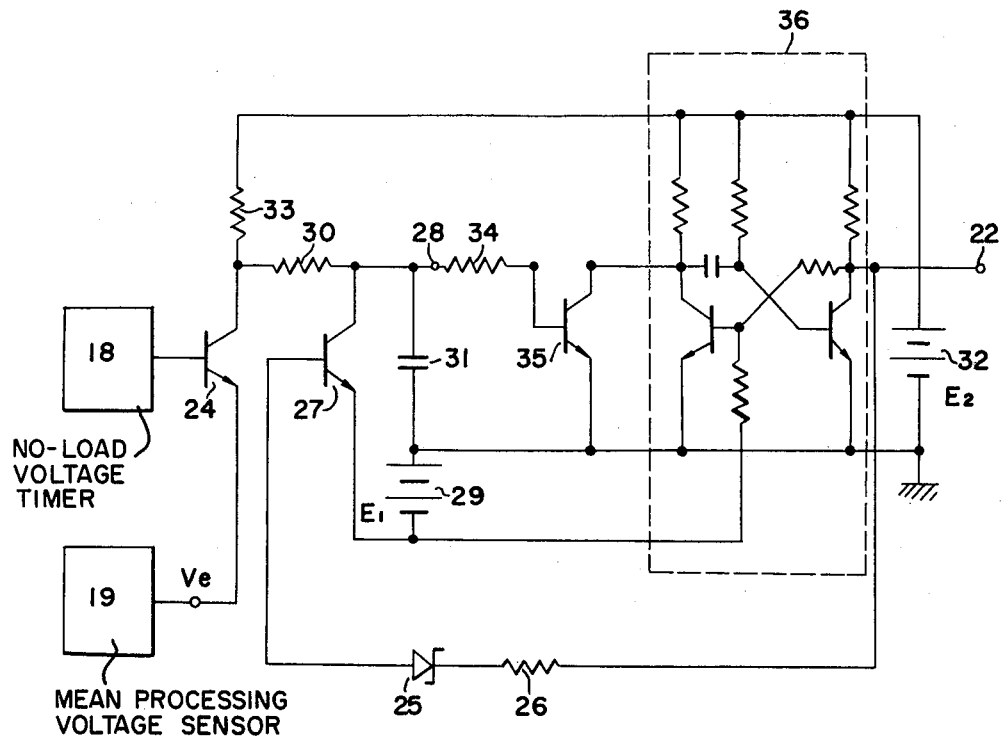
FIG. 6 is an electrical circuit diagram showing in greater detail an essential part of the apparatus shown in FIG. 5.

Referring now to FIG. 6, a circuit diagram of part of the control section 23 is shown. When a signal is present at the terminal 22, a group of transistors 3A, 3B, . . ., 3N are nonconducting. When a signal is not present at the terminal 22, these transistors are conducting. The transistor 24 becomes nonconducting by the signal from the circuit 18 only for the period during which a discharge is sustained. The emitter voltage, e.g., of the transistor 24 is changed by the signal from the circuit 19 which detects the state of the working gap. A zener diode 25 is conducting when a signal is present at the terminal 22, and nonconducting when no signal is present at the terminal 22. Thus the transistor 27 will become conducting through a base resistor 26 and zener diode 25 when a signal is present at the terminal 22.

This circuit operates in the following manner. When a voltage is impressed across the working gap but no discharge occurs, the transistor 24 turns on and the transistor 27 turns off. As a result, the potential at the terminal 28 falls from the potential $E_1$ of a DC power source 29 toward the emitter potential $V_e$ of the transistor 24 according to a time constant depending on a resistor 30 and a capacitor 31. During the period during which a discharge is sustained, the transistors 24 and 27 are nonconducting, and the potential at the terminal 28 rises toward the potential $E_2$ of a DC power source 32 according to a time constant depending on the resistor 30, a resistor 33 and the capacitor 31. When the potential at the terminal 28 becomes positive after a certain time interval, the transistor 35 turns on through the base resistor 34. As a result of this operation, a monostable multivibrator 36 operates to cause the transistors 3A, 3B, . . ., 3N to become nonconducting, and the voltage across the working gap falls to zero. After a certain time elapses, the multivibrator resumes its stable state, depending on its characteristic, to allow a voltage to be impressed across the working gap. When the no-load voltage impressing period is long enough, the potential at the terminal 28 approaches $V_e$ and does not fall further. Hence the discharge duration does not increase beyond an amount corresponding to the potential at the terminal 28. Thus, when the no-load impressing period is below the amount corresponding to the emitter potential $V_e$, the duration of discharge increases corresponding to the no-load voltage impressing period. When it is beyond the given length of time, the duration of discharge changes according to the voltage $V_e$ which depends on the state of the working gap.

Figure 7A:
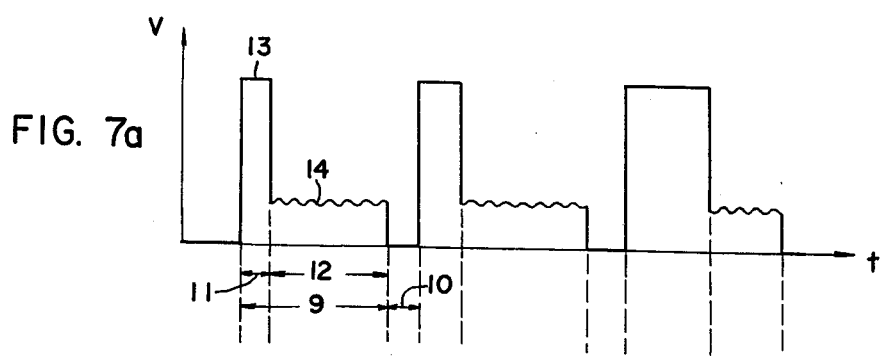
FIG. 7 is a diagram showing voltage and current wave-forms appearing across the working gap in the apparatus of FIG. 5.
Figure 7B:
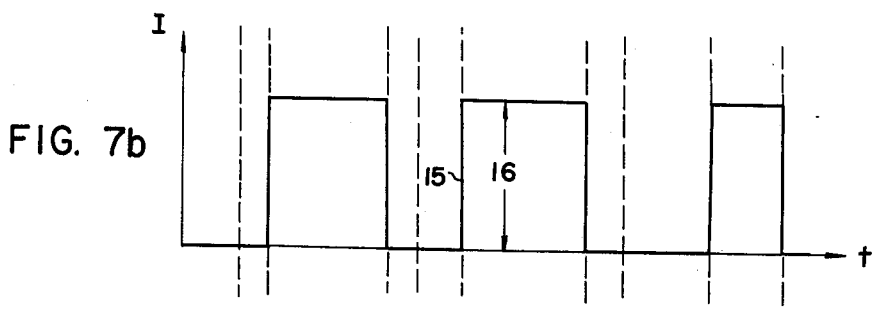
Figure 7C:
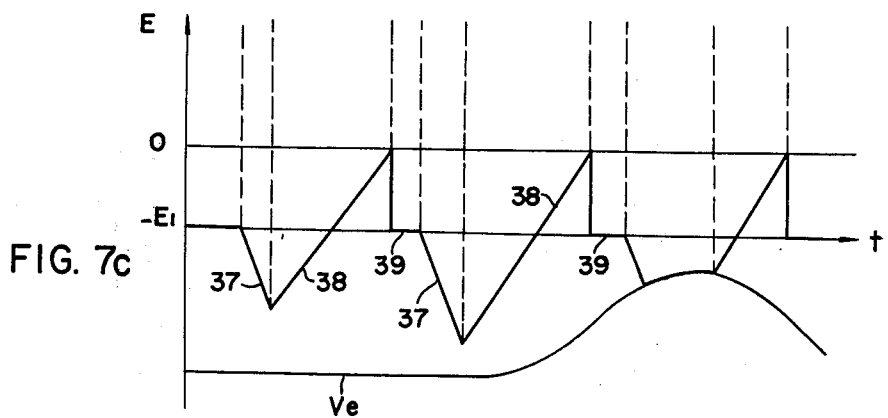

This operation will be better understood by referring to FIG. 7(a)–(c) wherein 7(a) is a voltage waveform appearing across the working gap, 7(b) is a current waveform appearing across the same, and 7(c) is a voltage waveform at the terminal 28 corresponding to the current waveform 7(b). In FIG. 7(c), the numeral 37 indicates a potential appearing at the terminal 28 when a no-load voltage is impressed, 38 is a potential at the terminal 28 for the duration of discharge, and 39 is the variation in a potential at the terminal 28 corresponding to the quiescent period. From FIG. 7(c) it is apparent that the potential 38 begins with a low level when the no-load voltage impressing period is long and the potential 37 is low. Therefore the potential 38 needs a long time to become positive. When the no-load voltage impressing period is short, the potential 38 soon becomes positive since it begins with a fairly high potential. The potential 37 at the terminal 28 changes as the voltage $V_e$ changes according to the state of the working gap; the lower the voltage $V_e$, the lower will the potential at the terminal 28 be biased even during the same no-load voltage impressing period. Consequently, it becomes possible to change the discharge duration according to the no-load voltage impressing period and the state of the working gap. According to this invention, because the period of the potential 38 can be changed by changing the voltage $E_1$ of the DC power source 29, the mean processing current can be controlled more extensively than was possible in the prior art.

FIG. 7(b) shows an example of current waveform appearing across the working gap in connection with the control of the mean processing current. From FIG. 7(b) it is apparent that the duration of discharge becomes short even if the state of the working gap has deteriorated and hence the mean processing current does not increase as it did in the prior art.

According to the prior art, as described, the presence of no-load voltage is liable to be hampered in the event that the state of the working gap has deteriorated to disallow the ions to become extinct across the electrode gap, and a spark is concentrated at a certain point on the workpiece. As a result, the mean processing current increases to adversely affect the state of the working gap. According to the present invention, however, the control circuits operate so that the duration of discharge is diminished for each pulse when the state of the working gap has deteriorated and the occurrence of a no-load voltage is hampered. This makes it possible to reduce the mean processing current and to bring about the extinction of ions across the working gap. Thus the state of the working gap is improved and stable processing is maintained at all times.

Figure 8:
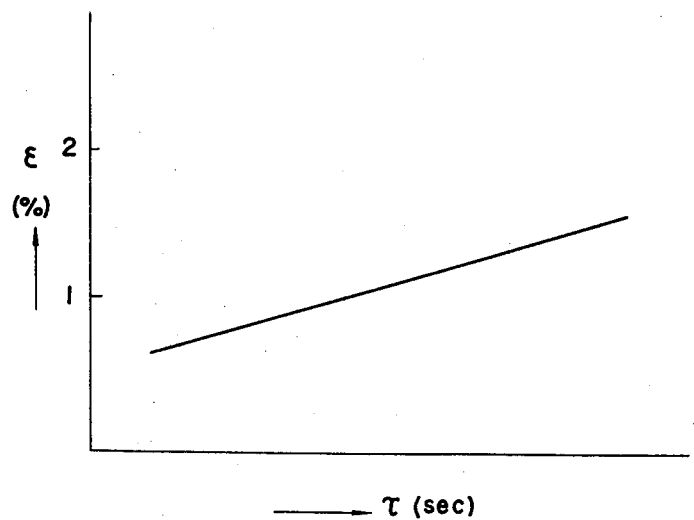
FIG. 8 is a graphic presentation showing the relationship between the quiescent period of a current pulse and the percentage of electrode consumption.

A noteworthy advantage of the invention lies in the marked improvement on the life of the electrode. In the prior art, the electrode was quickly consumed when the no-load voltage period was extended. This is because the substantial quiescent period of a current pulse becomes long as shown in FIG. 7(b) as the no-load voltage impressing period is increased. It is also apparent that, as shown in FIG. 8, the precentage consumption of electrode, $\epsilon$ %, taken relative to the change in the quiescent period of a current pulse, is prone to increase with increase in the quiescent period $\tau$ (sec). According to this invention, the duration of discharge is extended as the no-load voltage impressing period becomes long, to prevent the electrode from being consumed as a high rate as in the prior art. (It is well-known that the consumption of an electrode especially of a copper or graphite electrode, tends to decrease as the discharge duration increases.)

Generally, the percentage consumption of the electrode increases as the deterioration of the state of the working gap progresses. For example, even in a process where the expected electrode consumption is less than 1%, the percentage consumption is very liable to reach several percent if the state of the working gap is left uncontrolled. On the other hand, according to this invention, the state of the working gap is maintained stable at all times, in order to avoid the prior art problems.

According to this invention, the processing voltage is not necessarily lowered near zero to establish a quiescent period for the pulse impressed; a certain voltage may remain across the working gap only if the discharge current alone can be cut off. In other words, the quiescent period for which no voltage is present is equivalent to the period for which no current flow across the working gap.

Further, according to the invention, the no-load voltage is not necessarily limited to a constant value; instead, a high potential may be superposed thereupon or a series of impulses may be impressed. In the apparatus of the invention, the signal used for determining whether or not a discharge takes place may be considered as a kind of no-load voltage.

According to the invention, as has been described in detail, the duration of a discharge is quickly controlled in response to the state of the working gap detected in terms of processing voltage mean value and to the period during which a no-load voltage is impressed whereby the mean processing current is efficiently controlled and thus stable shaping operation is maintained even if the working gap is in a deteriorating state.

While a preferred embodiment of the invention has been described, it is to be clearly understood that the invention is not limited thereto or thereby but may be variously modified within the scope of the following claims.

What is claimed as new and desired to be secured by Letters Patent of the United States is:

1. A method of shaping a workpiece by electrical discharge, comprising the steps of:
   intermittently impressing a voltage pulse across a working gap formed between a workpiece and an electrode to generate a discharge during a discharge period;
   detecting the no-load period between the instant at which the voltage pulse is impressed across the working gap and the instant at which a discharge occurs between the workpiece and the electrode;
   detecting the average processing voltage across the working gap; and varying the discharge period in accordance with the detected no-load period and in accordance with the detected average processing voltage to cause the discharge period to vary directly as the no-load period and to vary inversely as the average processing voltage after the average processing voltage reaches a predetermined level.

2. Apparatus for shaping a workpiece by electrical discharge comprising:
   means for intermittently impressing a voltage pulse across a working gap formed between a workpiece and an electrode to generate a discharge during a discharge period;
   means for detecting the no-load period between the instant at which the voltage pulse is impressed across the working gap and the instant at which a discharge occurs between the workpiece and the electrode;
   means for detecting the average processing voltage across the working gap; and
   means for varying the discharge period in accordance with the detected no-load period and in accordance with the detected average processing voltage to cause the discharge period to vary directly as the no-load period and to vary inversely as the average processing voltage after the average processing voltage reaches a predetermined level.

3. Apparatus for shaping a workpiece by electrical discharge in accordance with claim 2 wherein the means for intermittently impressing a voltage pulse comprises a plurality of switching transistors connected between the workpiece and the electrode.

4. Apparatus for shaping a workpiece by electrical discharge in accordance with claim 2 further comprising a monostable multivibrator for controlling the length of the quiescent period between the termination of the discharge period and the initiation of the no-load period.

5. Apparatus for shaping a workpiece by electrical discharge in accordance with claim 2 wherein the means for varying the discharge period in accordance with the detected no-load period and in accordance with the detected average processing voltage comprises a circuit having a predetermined time constant.

* * * * *